United States Patent [19]

Beseke et al.

[11] 4,236,116
[45] Nov. 25, 1980

[54] LEVEL CONTROL CIRCUITRY FOR TWO WAY COMMUNICATION SYSTEM

[75] Inventors: Kermit Beseke, Schaumburg; Ronald Kopecki, Chicago, both of Ill.

[73] Assignee: Motorola, Inc., Schaumburg, Ill.

[21] Appl. No.: 919,015

[22] Filed: Jun. 26, 1978

[51] Int. Cl.³ .......................... H03K 5/08; H03L 5/00
[52] U.S. Cl. .................................. 328/169; 307/237; 307/264; 328/175; 330/141; 330/281
[58] Field of Search .................. 307/233 R, 234, 237, 307/264, 353; 328/169, 175; 330/141, 149, 281; 179/1 VC

[56] References Cited

U.S. PATENT DOCUMENTS

| 3,602,825 | 8/1971 | Senior | 307/264 X |
| 3,848,194 | 11/1974 | Nishimura et al. | 330/141 X |
| 4,037,163 | 7/1977 | Nicholas | 307/264 X |

FOREIGN PATENT DOCUMENTS 1094357 12/1967 United Kingdom .................. 179/1 VC Primary Examiner—John Zazworsky
Attorney, Agent, or Firm—Mark P. Kahler; James P. Hamley; James W. Gillman

[57] ABSTRACT

Signals carried over a multiplexed transmission medium between first and second stations suffer transmission losses such that the signal one station generates has a substantially greater magnitude than the signal it receives from the other station. A differential amplifier is utilized to extract and amplify the weaker signal thereby establishing signal balance. Following the differential amplifier is an automatic gain control stage which includes novel sample and hold and activity checker circuitry. The activity checker responds to the frequency of input signals to either allow variable gain control action or, when the frequency is representative of noise, to hold the gain control at its instantaneous value prior to the onset of noise.

3 Claims, 2 Drawing Figures

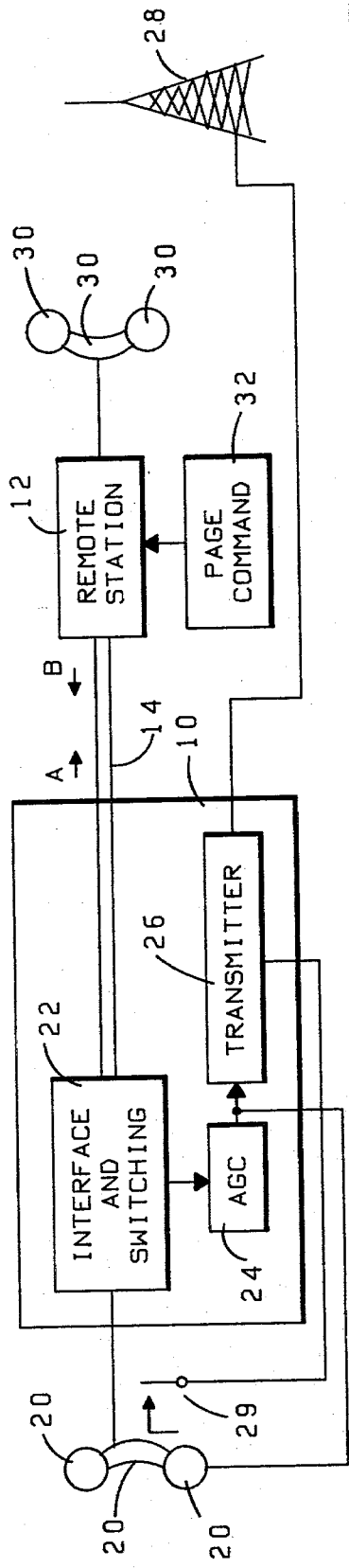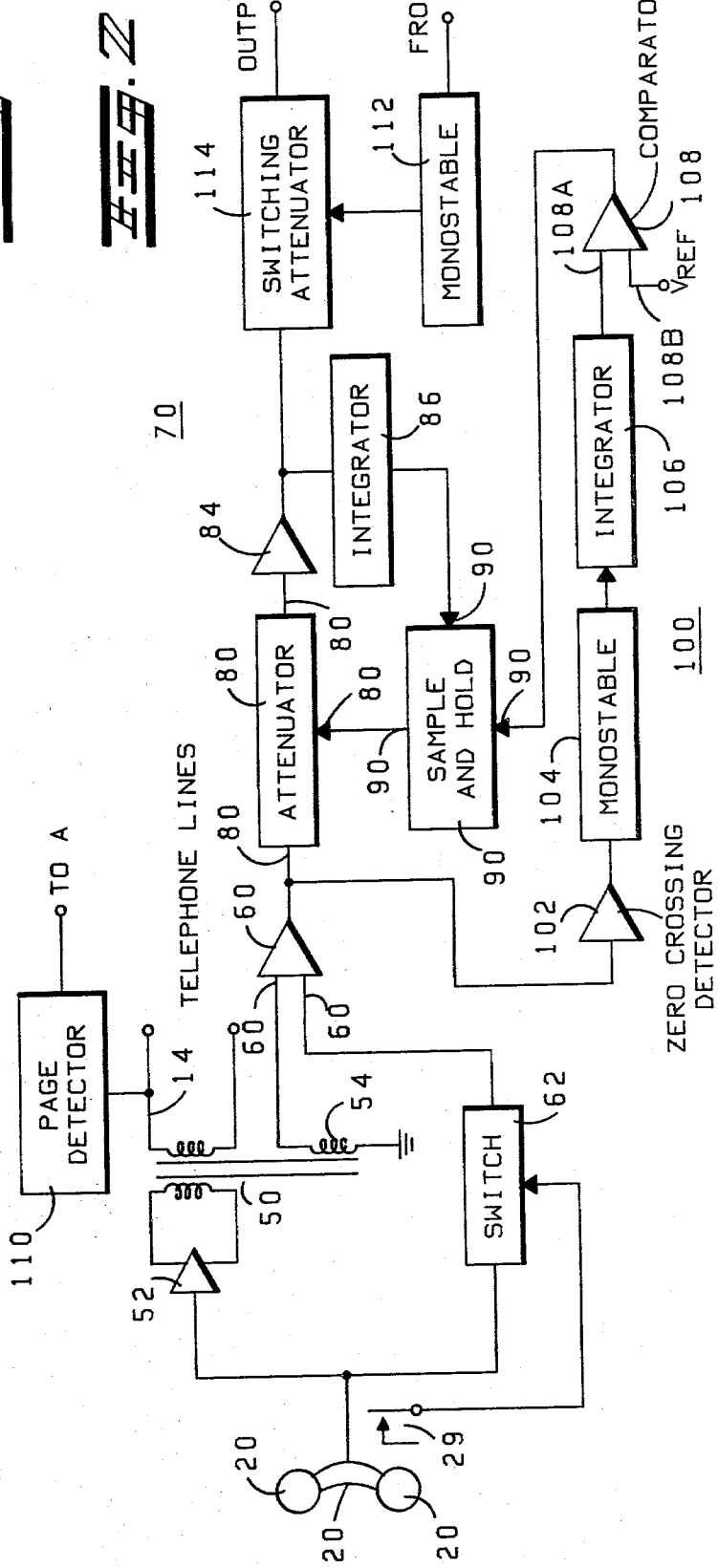

LEVEL CONTROL CIRCUITRY FOR TWO WAY COMMUNICATION SYSTEM

This is a division of U.S. Pat. No. 4,160,873, issued July 10, 1979.

BACKGROUND OF THE INVENTION

The present invention pertains to the communication art and, more particularly, to a means for controlling the level of signals carried over a duplexed line.

Controlling the level of signals carried over a duplexed transmission line has been a long established problem in the communication art. The problem arises as a result of insertion loss of long transmission lines. For example, if two stations are separated by twenty miles of conventional telephone line, the signal received by one station from the other may be attenuated 20 db from its original level. In many applications, it is imperative for successful operation of the system that compensation be made for transmission line losses. For example, at the receiving station wherein an operator handles a headset, if the operator's signal is some 20 db above that of the signal from the remote station, feedback within the operator's headset may obliterate the other stations signals. Further, in applications wherein either the remote station or base station signals are fed to a transmitter, it is important that the level of signals applied to the transmitter be constant.

One prior art approach to compensating for transmission line losses has been the use of two independent transmission lines between the base and remote stations. Fixed gain amplifiers are provided in each line thus exactly compensating for line losses. This system, while effective, ties up two transmission lines and thus, is quite expensive.

A second approach has been the use of complicated hybrid circuitry which provides precise impedance matching and transformer coupling to the transmission line such that the independent signals carried by the line may be separated and individually amplified. Such hybrids are extremely costly to manufacture and may require periodic adjustment for optimum operation.

The prior art has developed numerous automatic gain circuits which help assure that signal levels are maintained at a desired level. Such systems have exhibited two fundamental problems. Firstly, the gain control circuit must establish the relative level of a processed signal. This invariably takes a fixed period of time, during which noise bursts or periods of very low volume might occur, dependent on the initial state of the gain control circuit. In addition, the prior art gain control circuits have worked off of the average level of the signal being processed on a continuous basis. Thus, for transmissions, such as pauses between words in a message, prior art gain control circuits sense a very low signal level thereby increasing gain and amplifying background noise. Now when the next word is processed the initial portion thereof is amplified by a high gain factor thereby resulting in an annoying burst.

SUMMARY OF THE INVENTION

It is an object of this invention, therefore, to provide, in two way communication systems, improved level controlling circuitry which provides a precise means to correct for transmission line losses.

It is a further object of the invention to provide the above described improved level controlling circuitry which includes means to prevent system malfunctions due to pauses in received transmissions.

Briefly, according to the invention, improved circuitry is provided in a two way communication system of the type wherein first and second stations generate first and second signals, A and B, respectively. These signals are duplexed on a transmission medium which couples between the stations. The transmission medium exhibits losses such that the amplitude of the signal B received at the first station is significantly less than the stations own signal, A. The improvement includes a differential amplifier which has first and second inputs and an output. The amplifier amplifies the difference between signals appearing at its input by a predetermined factor and produces this amplified difference signal at its output. First coupling circuitry couples the transmission medium duplex signal, i.e. A+B, to the first differential amplifier input. A second coupling circuit couples the first station generated signal, A, to the second differential amplifier input. Thus, the output for the differential amplifier is the amplified signal B. By proper choice of the gain of the differential amplifier, the signal B can be restored to its original level as transmitted from the second station.

Unique automatic gain control circuitry processes the output from the differential amplifier. The gain control circuitry includes a controlled attenuator which has input, output and control terminals. The attenuator receives signals at its input terminal, attenuates these signals by a predetermined factor dependent upon a control signal applied at its control terminal and produces the attenuated signal at its output terminal. A control signal generator is coupled to the output terminal of the control attenuator and produces a predetermined control signal in response to the signal levels at this output. A sample and hold circuit couples between the control signal generator and the control terminal of the control attenuator. The sample and hold circuit is operable in a first mode to couple the produced control signal to the control terminal and is operable in a second mode to store the instantaneous value of the control signal and apply this stored signal to the control terminal. Activity checker circuitry detects the presence of a received signal at the attenuator input terminal and, in response thereto, activates the sample and hold circuit to its first mode, thereby allowing normal automatic gain control action. If the activity checker indicates that a signal is not being received, such as might occur during speech pauses, the sample and hold circuit is activated to its second mode.

BRIEF DESCRIPTION OF THE DRAWINGS

FIG. 1 illustrates the principle components of a two-way duplexed communication system; and FIG. 2 illustrates the preferred embodiments of the circuitry for controlling the signal levels of signals over the duplexed system shown in FIG. 1.

DETAILED DESCRIPTION OF THE PREFERRED EMBODIMENTS OF THE INVENTION

FIG. 1 illustrates a two-way communication system comprised of a base station 10 and a remote station 12 connected by a transmission medium 14. In this, the preferred embodiment of the invention, the transmission medium 14 is comprised of a balanced telephone line. Each station 10, 12 has a corresponding headset 20, 30 containing sending portions 20a, 30a, and listening portions 20b, 30b, respectively, which an operator uses to both transmit and receive audio signals. Thus, designating the signal originating from the base station 10 as signal A, and the signal from remote station 12 as signal B, the signal A+B is duplexed on transmission line 14. Each signal is sent on the line at a reference level of zero dBm. Due to line 14 losses, the signal received by each station is significantly attenuated. Thus, for a 20 mile length of telephone line, the signal level of B appearing at the base station 10 is likely to be a −2 dBm. This results in two principal problems. Firstly, the signal heard by the operator at the base station in the headset 20 is very weak for the remote station yet very strong for its own signal level, resulting in signal masking. Secondly, as FIG. 1 illustrates, in many applications the signal either from remote station 12 to base station 10 may be routed to a transmitter 26 for transmission over an antenna system 28 to, possibly, a mobile receiver. Thus, it is important that the signal levels A and B be of approximately the same magnitude such that transmission levels are optimum.

Interfacing signal circuitry 22 couples the transmission line 14 to the headset 20 and, through the automatic gain control circuit 24, to the transmitter 26. The gain control circuitry 24, the preferred embodiment of which is described more fully hereinbelow with respect to FIG. 2, operates to maintain that two signals, A and B, at a relatively constant level, outputting these signals to the headset 20 and the transmitter 26. Transmitter 26 may be keyed by a push-to-talk switch 29 which, preferably, is mounted to the headset 20.

Coupled to the remote station 12 is a page command circuit 32. In many applications the remote station 12 may wish to address the transmitter 26 and send a message over antenna 28 to a selected one or ones of mobile stations. This selection includes sending a paging tone or signal which indicates to those specified mobiles that a transmission is in progress. The conventional means for carrying the page command over telephone lines, such as line 14, is by application of the tones with a DC current to the lines which, via the interfacing switching circuitry 22 in the base station 10, maintains the proper paging tone levels.

Thus, the system of FIG. 1 illustrates a two-way duplexed communication system allowing intercom operation between a remote station 12 and base station 10 and RF transmission capabilities both by base station 10 and by remote control from remote station 12.

FIG. 2 illustrates, in block diagram form, the preferred embodiment of the level controlling circuitry according to the invention used in the base station 10 of FIG. 1. Here, the balanced, duplexed line 14 is coupled to a winding of an interstage transformer 50. Applied to another winding of interstage transformer 50 is the output of line driver amplifier 52 which amplifies the signals A produced by the headset 20 of the base station. Thus, the signal A originating from headset 20 is amplified in line amplifier 52 and inductively coupled through interstage coupling transformer 50 to the balanced line 14. A tertiary winding 54 electromagnetically couples a portion of the signal A+B to the noninverting input 60a of a differential amplifier 60. Coupled to the inverting input 60b of the differential amplifier 60 is the signal A as supplied by the headset 20 and routed through a switch 62. Switch 62 is activated by a push-to-talk switch 29 on headset 20 to couple the signal A to the inverting input 60b of the differential amplifier 60 only when the system is in the intercom mode, the switch being open during radio transmission.

Differential amplifier 60 is of conventional design and amplifies the difference between signals appearing at its input 60a, 60b, by a predetermined factor, producing these amplified signals at its output. Here, with switch 62 closed, the output from the differential amplifier 60 is equal to $[(A+B)-A] \times$ the gain factor of the amplifier. Thus, the output from the differential amplifier 60 is signal B at an amplified level. For the above example wherein the loss in signal B due to the 20 mile telephone line is 20 db, the differential gain of amplifier 60 can be designed to be 20 db or greater whereby the output from the differential amplifier 60 contains a level of signal B at equal to or greater than the level of signal A. Thus, the use of the tertiary winding 54 and the differential amplifier 60 substantially restores the signals A and B to their desired levels.

The output from the differential amplifier 60 feeds to unique automatic gain control circuitry, indicated generally at 70. Gain control circuitry 70 includes an input attenuator 80 which has an input terminal 80a, an output terminal 80b and a control terminal 80c. Acting in the conventional manner, the attenuator 80 responds to control signals received at its control terminal 80c to vary the attenuation of signals received at input terminal 80a, producing these attenuated signals at its output terminal 80b. Following the attenuator 80 is a fixed gain amplifier 84, the output from which feeds to an integrator circuit 86. Integrator 86 generates a DC voltage which is representative of the average level of AC levels appearing at the output of amplifier 84. These DC control signals are fed to the input 90a of sample and hold circuit 90. Sample and hold circuit 90 has been provided with an output 90b which couples to the control input 80c of the control attenuator 80 and a mode control input 90c. When the input signal appearing at mode control 90c activates the sample and hold signal 90 to its first mode, the DC control signals generated by the integrator 86 are continuously fed to the sample and hold output 90b whereby they are used to control the attenuator 80 in the conventional manner of prior art attenuators. Thus, for increasing or decreasing signal levels appearing at the output of amplifier 84, a corresponding change occurs in the DC control signal 86 thereby altering the attenuation of attenuator 80 to maintain the signals at the output of amplifier 84 at a desired output level. However, when the sample and hold circuit 90 is activated to its second mode the overall feedback loop from integrator 86 to the control input of 80c of attenuator 80 is open. Now, that instantaneous value of control signal from integrator 86 which occurred prior to the transition of the sample and hold circuit 90 from its first to its second mode is stored and is continuously applied to the control input 80c of the attenuator 80. As is described more fully hereinbelow, this operation of sample and hold circuit 90 prevents noise bursts or dropouts which would otherwise exist in the gain control system.

Also coupled to the differential amplifier 60 is an activity checker 100. The first stage of activity checker 100 is a zero crossing detector, or limiter 102. AC signals applied to the input of the zero crossing detector 102 result in sharp transition square waves produced at the zero detector output. The negative transitions of the output from the zero crossing detector trigger a following monostable multivibrator stage 104. This stage produces a 100 microsecond output pulse corresponding to each input negative zero crossing transition.

The pulse output from the monostable multivibrator 104 is integrated in an integrator 106. Thus, the integrator 106 produces at its output a DC level representative of the frequency pulses generated by the monostable multivibrator 104.

The DC output from integrator 106 is applied to the first input 108a of a voltage comparator 108. Applied to the second 108b of voltage comparator 108 is a reference DC voltage $V_{ref}$. If the DC output from integrator 106 is below the reference level, $V_{ref}$, the output from the comparator, which couples to the mode input control 90c of sample and hold circuit 90, activates sample and hold ciruit 90 to its first mode. If, however, the DC voltage from integrator 106 is greater than $V_{ref}$, sample and hold circuit 90 is activated to its second mode.

Operation of the activity detector is based on the fact that the primary signals from a received transmission such as voice, have fundamental frequencies of approximately 500 Hz. Signals from extraneous sources, such as noise, have considerably higher fundamental frequencies. Thus, since the monostable 104 produces a pulse for every zero crossing, the number of pulses produces by monostable 104 and, thus, the DC output of integrator 106, will be high for these extraneous signals. Therefore, the value of $V_{ref}$ is selected such that the sample and hold circuit 90 operates in its first, continuous gain control mode, only for signals detected as being desired information signals. Otherwise, the sample and hold circuit 90 is activated to its second mode, indicative of the absence of a received signal.

By detecting activity on a input line, and discriminating activity from noise or extraneous signals, the instant automatic gain control circuit provides a significant advantage over gain control circuits known in the prior art. As mentioned hereinabove, in prior art circuits the gain control might reduce attenuation, and thus increase overall gain, during pauses between spoken words. This would result in a noise burst once the next word were received and increase background noise during pauses. The instant system eliminates such noise bursts, due to the fact that the activity checker 100 operates the sample and hold circuit to its second mode during such pauses, thereby maintaining gain at the desired level.

Also coupled to the balanced telephone line 14 is a page detector 110. As mentioned with respect to FIG. 1, if a remote station desires to send a page signal it generates a DC signal on the telephone lines 14. Page detector 110 senses the presence of this DC signal and upon its reception activates a monostable multivibrator 112. Monostable multivibrator 112 activates a switching attenuator 114, which couples to the output of switch gain 84, to de-emphasize resulting signals to the system. In such systems, transmission of voice information is pre-emphasized to improve signal to noise performance, whereas it is desirable to send the paging tones at a constant amplitude. Thus, for the duration of broadcast page tones, the switching attenuator provides de-emphasis to the control tone signals. When the switching attenuator 114 is not activated by monostable 112, corresponding to the absence of paging tones, the attenuator 114 passes the audio signals without any frequency shaping.

Thus, the switching attenuator 114 comprises the output of the AGC, as shown in block 24 in FIG. 1, which is thereafter fed to subsequent stages including the transmitter, and the fedback audio signal to the headset.

Referring again to switch 62, when the push-to-talk switch 29 is activated by the operator, indicating a desire for audio frequency transmission, switch 62 open circuits, whereby the only input to the differential amplifier 60 is at its first input 60a. The reason for including switch 62 is that, due to phase shifts in the coupling transformer 50, the signal A appearing at the first input 60a of the differential amplifier 60 is slightly phase shifted from that appearing at the second input 60b. Thus, the output from the differential amplifier may contain suppressed harmonics of the signal A. Therefore, switch 62 open circuits the input line to differential amplifier input 60b thereby maintaining a high quality level of signal A.

In summary, improved level controlling circuitry has been described for use in a two-way, duplex, communication system. While preferred embodiments of the invention have been described in detail, it should be apparent that many modifications and variations thereto are possible, all of which fall within the true spirit and scope of the invention.

For example, whereas the preferred embodiment of the invention illustrates a system employing a base station coupled with a single remote, any number of remotes could be coupled in the system.

We claim:

1. An automatic gain control circuit comprising:
controlled attenuator means having an input, output and control terminals, said attenuator means receiving signals at its input terminal, attenuating said signals by a predetermined factor dependent upon a control signal at said control terminal and producing said attenuated signal at said output terminal;
control signal generating means coupled to said output terminal for producing a perdetermined control signal in response to the signal levels thereat;
sample and hold means, coupled between said control signal generating means and the control terminal of said controlled attenuator means, and being operable in a first mode to couple said produced control signal to said control terminal and being operable in a second mode to store the instantaneous value of said control signal and couple said stored signal to said control terminal; and
zero crossing detector means for detecting the number of zero crossings made by a received signal at said attenuator input terminal and activating said sample and hold means to said first mode upon detecting a number of zero crossings corresponding to an information signal and activating said sample and hold means to said second mode upon detecting a number of zero crossings corresponding to a noise signal.

2. The automatic gain control circuit of claim 1 wherein the zero crossing detector means comprises:
zero transition detector means for determining the number of zero transitions of the signal at the attenuator input terminal, and
comparator means for producing an output signal to activate said sample and hold means to its first mode if and only if the number of zero transitions is less than a predetermined minimum.

3. The automatic gain control circuit of claim 2 wherein:

said zero transition detector means includes means for producing a pulse of perdetermined time duration in response to each zero crossing of the signal at the attenuator input terminal and integrator means for integrating said pulses to produce a DC signal having a magnitude representative of the average number of said pulses occurring over a time interval, and wherein said comparator means comprises a voltage comparator having the input from said integrator means at one input and a predetermined level DC signal at its other input such that for integrator produced DC signals representative of the zero transitions at the attenuator input being below said predetermined level said comparator activates said sample and hold means to its first mode, said integrator produced signal otherwise activating said sample and hold means to its second mode.

* * * * *

UNITED STATES PATENT AND TRADEMARK OFFICE
CERTIFICATE OF CORRECTION

PATENT NO. : 4,236,116
DATED : 11/25/80
INVENTOR(S) : Kermit Beseke - Ronald Kopecki It is certified that error appears in the above—identified patent and that said Letters Patent is hereby corrected as shown below:

In column 3, line 10 delete "2 dBm" and substitute --20 dBm.

In column 5, line 24 delete "produces" and substitute --produced

In column 6, line 5 delete "audio" and substitute --radio.

Signed and Sealed this

Seventh Day of July 1981

[SEAL]

Attest:

RENE D. TEGTMEYER

Attesting Officer

Acting Commissioner of Patents and Trademarks